US012616327B2

(12) United States Patent
Garcia et al.

(10) Patent No.: US 12,616,327 B2
(45) Date of Patent: May 5, 2026

(54) BEVERAGE BREWING SYSTEMS AND METHODS

(71) Applicant: Sensio Inc., New York, NY (US)

(72) Inventors: Jorge B. Garcia, Rogers, AR (US); Keith Bilodeau, Plantsville, CT (US); Tristan Mckeever, Montreal (CA)

(73) Assignee: Sensio Inc., New York City, NY (US)

( * ) Notice: Subject to any disclaimer, the term of this patent is extended or adjusted under 35 U.S.C. 154(b) by 484 days.

(21) Appl. No.: 18/111,886

(22) Filed: Feb. 20, 2023

(65) Prior Publication Data

US 2023/0263330 A1 Aug. 24, 2023

Related U.S. Application Data

(60) Provisional application No. 63/311,818, filed on Feb. 18, 2022.

(51) Int. Cl.
| | |
|---|---|
| *A47J 31/00* | (2006.01) |
| *A47J 31/36* | (2006.01) |
| *A47J 31/46* | (2006.01) |
| *A47J 31/54* | (2006.01) |

(52) U.S. Cl.
CPC ......... *A47J 31/007* (2013.01); *A47J 31/3676* (2013.01); *A47J 31/461* (2018.08); *A47J 31/542* (2013.01)

(58) Field of Classification Search
CPC ...... A47J 31/007; A47J 31/02; A47J 31/3676; A47J 31/40; A47J 31/407; A47J 31/46; A47J 31/461; A47J 31/465; A47J 31/468; A47J 31/469; A47J 31/542
See application file for complete search history.

(56) References Cited

U.S. PATENT DOCUMENTS

| | | | | |
|---|---|---|---|---|
| 4,649,809 | A | 3/1987 | Kanezashi | |
| 4,757,754 | A | 7/1988 | Welker | |
| 7,063,238 | B2 * | 6/2006 | Hale | A47J 31/3638 |
| | | | | 222/83.5 |
| 7,770,510 | B2 * | 8/2010 | Hart | A47J 31/56 |
| | | | | 99/290 |

(Continued)

FOREIGN PATENT DOCUMENTS

| | | |
|---|---|---|
| CN | 212521528 U | 2/2021 |
| DE | 102020200565 A1 | 7/2021 |

(Continued)

OTHER PUBLICATIONS

International Preliminary Report on Patentability from corresponding International Application No. PCT/US2023/013439 dated Aug. 29, 2024.

(Continued)

*Primary Examiner* — Hung D Nguyen
(74) *Attorney, Agent, or Firm* — DLA Piper LLP (US)

(57) ABSTRACT

A mechanism for a brewing machine includes a fluid reservoir, a first receptacle downstream from the fluid reservoir, a second receptacle downstream from the fluid reservoir, a first channel and a second channel. The first channel is configured and adapted to provide a fluid from the fluid reservoir to the first receptacle. The second channel is configured and adapted to provide a fluid from the fluid reservoir to the second receptacle.

14 Claims, 4 Drawing Sheets

(56) References Cited

U.S. PATENT DOCUMENTS

| | | | | |
|---|---|---|---|---|
| 8,166,867 | B2 * | 5/2012 | Skalski | A47J 31/369 |
| | | | | 99/290 |
| 8,166,868 | B2 * | 5/2012 | Skalski | A47J 31/4403 |
| | | | | 99/290 |
| 9,125,521 | B2 * | 9/2015 | Mills | A47J 31/0615 |
| 10,533,790 | B2 | 1/2020 | Sakthivel et al. | |
| 10,729,278 | B2 | 8/2020 | Ting et al. | |
| 11,129,490 | B2 | 9/2021 | Park et al. | |
| 2002/0121197 | A1 * | 9/2002 | Mercier | A23F 3/18 |
| | | | | 99/279 |
| 2017/0251866 | A1 | 9/2017 | Garcia | |
| 2020/0305636 | A1 | 10/2020 | Bais et al. | |

FOREIGN PATENT DOCUMENTS

| | | | |
|---|---|---|---|
| EP | 1327407 | A2 | 7/2003 |
| EP | 1474021 | A2 | 11/2004 |
| EP | 1778063 | A1 | 5/2007 |
| EP | 1859712 | A1 | 11/2007 |
| EP | 2263501 | A1 | 12/2010 |
| EP | 2368466 | A1 | 9/2011 |
| EP | 2690992 | A1 | 2/2014 |
| EP | 2906085 | A1 | 8/2015 |
| EP | 3197328 | A1 | 8/2017 |
| EP | 3280301 | A1 | 2/2018 |
| EP | 3364831 | A1 | 8/2018 |
| GB | 2185303 | A | 7/1987 |
| WO | 03/065859 | A2 | 8/2003 |
| WO | 2006016054 | A1 | 2/2006 |
| WO | 2012130662 | A1 | 10/2012 |
| WO | 2014056802 | A1 | 4/2014 |
| WO | 2016045878 | A1 | 3/2016 |
| WO | 2016162204 | A1 | 10/2016 |
| WO | 2017068449 | A1 | 4/2017 |

OTHER PUBLICATIONS

PCT International Search Report and Written Opinion, of the United States Patent Office, issued in corresponding International Patent Application No. PCT/US2023/013439, mailed on May 23, 2023.

* cited by examiner

BEVERAGE BREWING SYSTEMS AND METHODS

CROSS-REFERENCE TO RELATED APPLICATION

This application claims priority to U.S. Provisional Patent Application Ser. No. 63/311,818, filed Feb. 18, 2022, the contents of which are herein incorporated by reference in their entirety.

BACKGROUND

Technological Field

The present disclosure relates generally to beverage brewing machines, and specifically to a system for brewing one or multiple beverages simultaneously.

Description of Related Art

Currently, single-serve, pod-style beverage maker machines allow the brewing of only a single pod per brew cycle by heating and dispensing the required volume of water for one pod. This requires users to wait for each other to finish, or have to use multiple pods and wait times.

Thus a need exists for providing a beverage maker system that effectively allows multiple servings of beverage to be brewed simultaneously or in succession into multiple separate containers or into a single, larger container using beverage pods or capsule. The present disclosure provides a solution for this need.

SUMMARY OF THE DISCLOSURE

This disclosure relates to a brewing machine having a mechanism allowing the simultaneous or successive brewing of multiple beverage pods into a single, larger container, or into individual containers. Additionally, the disclosure can also be used to brew ground beverage filter baskets.

A mechanism for a brewing machine includes a fluid reservoir, a first receptacle downstream from the fluid reservoir, a second receptacle downstream from the fluid reservoir, a first channel and a second channel. The first channel is configured and adapted to provide a fluid from the fluid reservoir to the first receptacle. The second channel is configured and adapted to provide a fluid from the fluid reservoir to the second receptacle.

In some embodiments, the mechanism includes a purge assembly positioned between the fluid reservoir and the first and second receptacles. The purge assembly can include a check-valve and an air pump, and configured and adapted for flushing fluid back to the fluid reservoir.

In some embodiments, the mechanism can include a main fluid channel upstream from the first and second channels for providing fluid from the fluid reservoir to the first and second channels. A diverter valve can be between the main fluid channel the first and second channels for dividing fluid flow from the main fluid channel to the first and second channels. The mechanism can include a heating element located between the fluid reservoir and the first and second receptacles. The heating element can be configured and adapted to heat a fluid to a desired temperature. The heating element can include a single channel. The main fluid channel can be directed through the single heating channel upstream from the diverter valve.

In some embodiments, the first channel can extend from the fluid reservoir to the first receptacle and the second channel extends from the fluid reservoir to the second receptacle. The heating element can include first and second heating channels. The first channel can be directed through the first heating channel, and the second channel can be directed through the second heating channel. The mechanism can include two heating elements, each heating element located between the fluid reservoir and a respective one of the first and second receptacles. Each heating element can be configured and adapted to heat a fluid to a desired temperature. Each heating element can include a respective heating channel. The first channel can be directed through the heating channel of a first of the two heating elements, and the second channel can be directed through the heating channel of a second of the two heating elements.

In some embodiments, the first receptacle is configured and adapted to receive an ingredient container. The second receptacle can be configured and adapted to receive an ingredient container. The ingredient container can be a coffee capsule or a coffee filter. The first and second receptacles can be each configured and adapted to receive an ingredient.

In accordance with another aspect, a method for brewing a beverage with a brewing machine includes supplying a fluid from a fluid reservoir to at least one of a first receptacle downstream from the fluid reservoir, or a second receptacle downstream from the fluid reservoir. The method includes heating the fluid from the fluid reservoir to a desired temperature with a heating element located between the fluid reservoir and at least one of the first receptacle or the second receptacle.

In some embodiments, supplying the fluid can include supplying the fluid to a main fluid channel upstream from the first and second receptacles, and then to at least one of a first channel upstream from the first receptacle or a second channel upstream from the second receptacle.

In some embodiments, the method can include comprising dividing fluid flow from the main fluid channel to at least one of the first channel or second channel using a diverter valve positioned between the main fluid channel and the first and second channels. Heating the fluid can include heating the fluid with a single heating channel in the heating element upstream from the diverter valve. The main fluid channel can be configured and adapted to flow through the single heating channel upstream.

In some embodiments, supplying the fluid can include at least one of supplying the fluid to the first receptacle via a first channel that extends from the fluid reservoir to the first receptacle, or supplying the fluid to the second receptacle via a second channel that extends from the fluid reservoir to the second receptacle. Heating the fluid can include heating the fluid with a first heating channel and the heating element. The first channel can be configured and adapted to flow through the first heating channel. Heating the fluid can include heating the fluid with a second heating channel in at least one of the heating element, or a second heating element. The second channel can be configured and adapted to flow through the second heating channel. The method can include flushing fluid back to the fluid reservoir with a purge assembly positioned between the fluid reservoir and the heating element.

These and other features of the systems and methods of the subject disclosure will become more readily apparent to those skilled in the art from the following detailed description of the preferred embodiments taken in conjunction with the drawings . . .

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
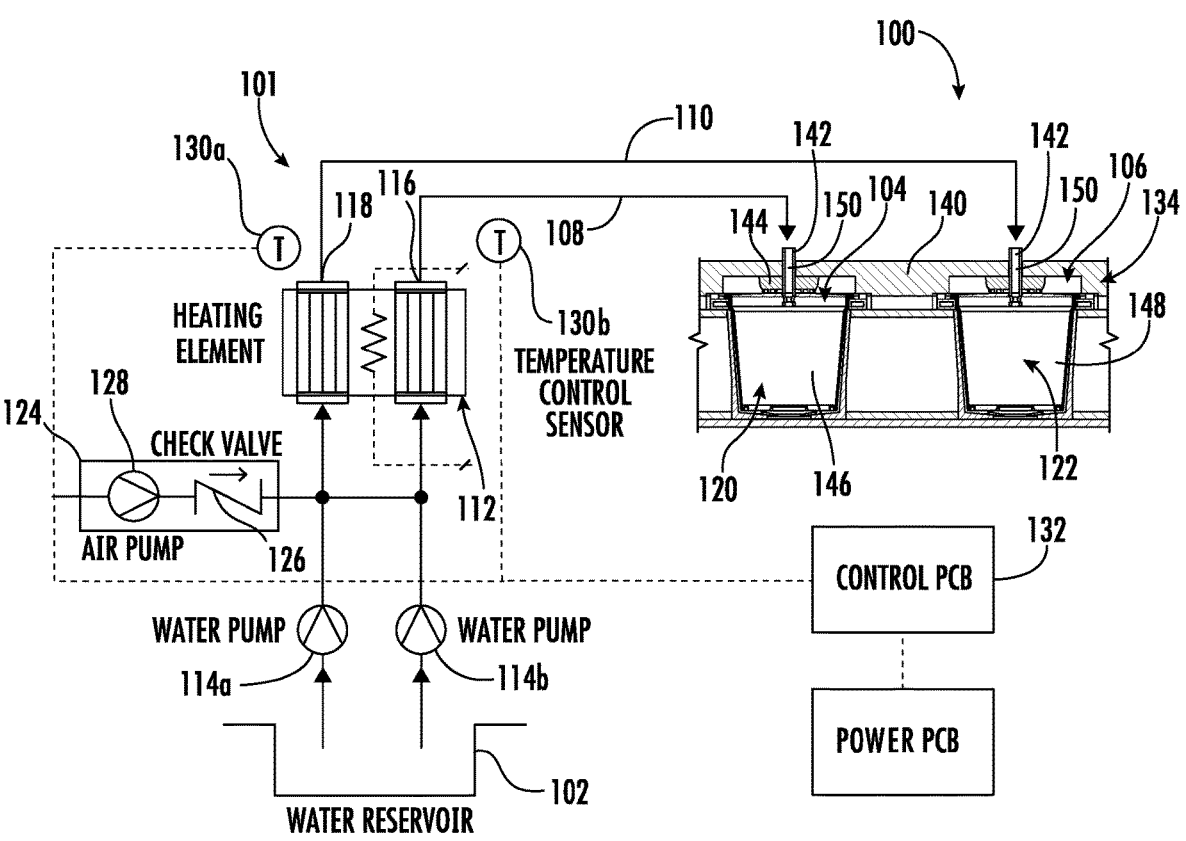
FIG. 1A is a schematic depiction of a mechanism for a beverage machine constructed in accordance with an embodiment of the present disclosure, showing two parallel flow paths for providing water to two capsules or pods simultaneously.

Reference will now be made to the drawings wherein like reference numerals identify similar structural features or aspects of the subject disclosure. For purposes of explanation and illustration, and not limitation, a partial view of an exemplary embodiment of a pod or capsule beverage brewing system in accordance with the disclosure is shown in FIGS. 1A and 1s designated generally by reference character 100. Other embodiments of the brewing system in accordance with the disclosure, or aspects thereof, are provided in FIGS. 1B, 2, 3A and 3B, as will be described. The systems and methods described herein can be used to allow the simultaneous or successive brewing of multiple coffee pods into a single, larger container, or into individual containers. Additionally, embodiments of the present disclosure can also be used to brew ground coffee in filter baskets, or the like.

Figure 1B:
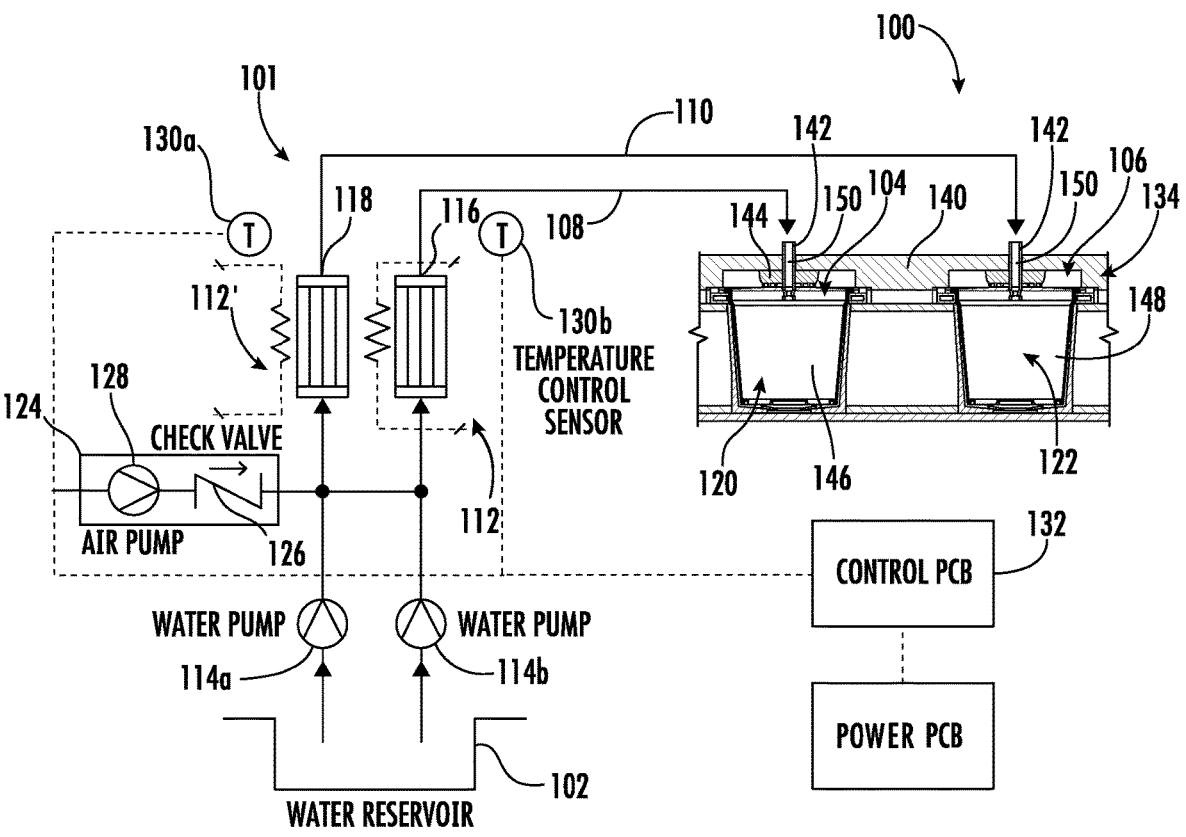
FIG. 1B is a schematic depiction of a mechanism for a beverage machine constructed in accordance with another embodiment of the present disclosure, showing two parallel flow paths for providing water to two capsules or pods simultaneously each having separate heating elements.
Figure 2:
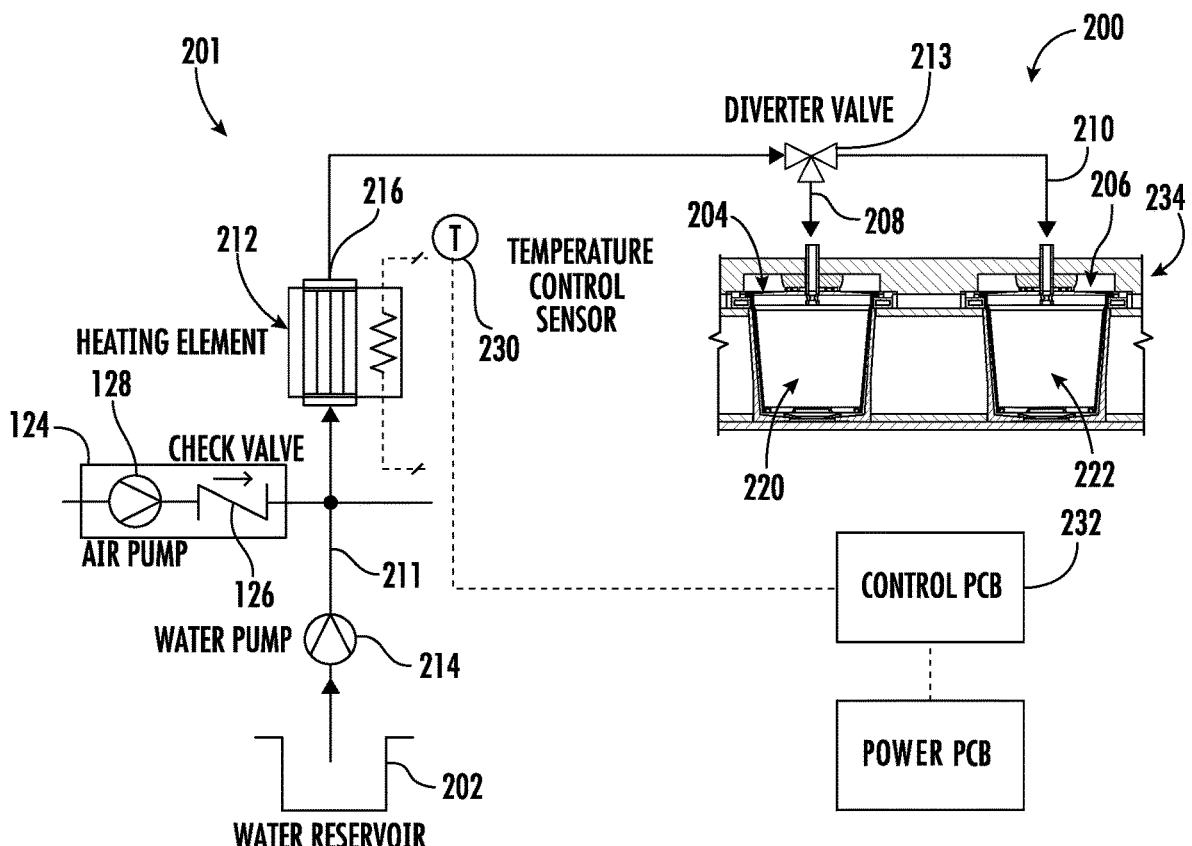
FIG. 2 is a schematic depiction of a mechanism for a beverage machine constructed in accordance with another embodiment of the present disclosure, showing a main fluid channel and a diverter valve splitting the main fluid channel into two parallel flow paths.

As shown in FIG. 1A, a mechanism 101 for a brewing machine 100 includes a fluid reservoir 102, a first receptacle 104 downstream from the fluid reservoir 102, a second receptacle 106 downstream from the fluid reservoir 102, a first channel 108 and a second channel 110. In the embodiment of FIGS. 1A-1B and 2, the fluid can be water. The first channel 108 is configured and adapted to provide a fluid from the fluid reservoir 102 to the first receptacle 104. The first channel 108 is in fluid communication with and extends from the fluid reservoir 102 to the first receptacle 104 and the second channel 110 is in fluid communication with and extends from the fluid reservoir 102 to the second receptacle 106. The second channel 110 is configured and adapted to provide a fluid from the fluid reservoir to the second receptacle 106. Traditional single-serve beverage pod makers allow the brewing of only a single pod per brew cycle by heating and dispensing the required volume of water for one pod. The mechanisms of the present disclosure work by heating and subsequently dispensing the required volume of water to brew one or multiple beverage pods. Each receptacle 104 and 106 is configured and adapted to receive a respective ingredient or ingredient container. The ingredient containers can be beverage pods 120 and 122, e.g. a coffee capsule, coffee filters, or the like.

With continued reference to FIG. 1A, the mechanism 101 includes a heating element 112 located between the fluid reservoir 102 and the first and second receptacles 104, 106. Heating element 112 is configured and adapted to heat a fluid to a desired temperature. Water is pumped from the fluid reservoir 102 into first and second channels 108 and 110, respectively, via independent pumps 114a and 114b. The temperature in channels 108 and 110 is controlled by the rate of water flow. This independent temperature control is enabled by having individually controlled pumps 114a and 114b along with individual temperature sensors 130a and 130b measuring the temperature in each channel 108 and 110 downstream from heating element 112. Each temperature sensor 130a and 130b are operatively coupled to respective channels 108 and 110 downstream from heating element 112 to measure the temperature in each. If brewing multiple beverages, e.g. two pods, at once, the water pumps 114a and 114b will operate simultaneously to pump the required amount of water at a given temperature per beverage pod. The water traveling through first and second channels 108 and 110, respectively, is heated by heating element 112. Heating element 112 is a multi-channel heating element 112 having first and second heating channels 116 and 118, respectively. The water in the first and second heating channels 116 and 118 is simultaneously heated as it flows through the heating element 112. After heating, the water is dispensed into separate pods 120 and 122, disposed within respective first and second receptacles 104 and 106, for brewing.

With continued reference to FIG. 1A, the mechanism 101 includes a purge assembly 124 positioned between the fluid reservoir 102 and the heating element 122. Purge assembly 124 includes a check-valve 126 and an air pump 128. Purge assembly 124 is configured and adapted for flushing fluid back to the fluid reservoir 102. Air pump 128 purges remaining water in the first and second channels 108 and 110 and pods 120 and 122 after brewing. In the embodiment of FIG. 1A, two flow paths are shown. It is contemplated, however, that there can be two or more flow paths and receptacles as desired in a given application. Mechanism 101 includes a temperature sensor 130 and at least one PCB 132 configured and adapted to monitor the temperature of the water as it is heated. Once the brew cycle is complete, the air pump 128 will purge the lines 108 and 110 of remaining water and dry the pod(s) 120 and 122. If brewing a single pod at a time, only a single water pump, e.g. pump 114a, will operate but the method for using the mechanism 101 otherwise follows the procedure stated above.

As shown in FIG. 1B, in another embodiment of mechanism 101 includes two heating elements 112 and 112', each located between the fluid reservoir 102 and the first and second receptacles 104, 106. Mechanism 101 of FIG. 1B is the same as mechanism 101 of FIG. 1A except that FIG. 1B includes additional heating element 112'. Both heating elements 112 and 112' are configured and adapted to heat fluid in a respective one of channels 108 and 110 to a desired temperature. Similar to FIG. 1A, water is pumped from the fluid reservoir 102 into first and second channels 108 and 110, respectively, via independent pumps 114a and 114b. In FIG. 1B, each heating element 112 and 112' is a single-channel heating element each having their own heating channels 116 and 118, respectively. Having separately controllable heating elements 112 and 112' enables more individualized control over the temperature through the given channels 108 and 110.

With reference now to FIG. 2, another embodiment of a mechanism 201 for a brewing machine 200 includes a fluid reservoir 202, a first receptacle 204 downstream from the fluid reservoir 202, a second receptacle 206 downstream from the fluid reservoir 202. Mechanism 201 includes a first channel 208 and a second channel 210. Mechanism 201 includes a main fluid channel 211 upstream from the first channel 208 and the second channel 210 for providing fluid from the fluid reservoir 202 to the first and second channels 208 and 210, respectively. A diverter valve 213 is between the main fluid channel 211 and the first and second channels 208 and 210 for dividing fluid flow from the main fluid channel 211 to the first and second channels 208 and 210. The diverter valve 213 can be a solenoid valve that electronically controls the division of water from the main fluid channel 211 selectively allowing water to flow to a single pod, or multiple, based on the function chosen and the number of receptacles, e.g., receptacles 204 and 206, that will be used to brew.

As shown in FIG. 2, the mechanism 201 includes a heating element 212 located between the fluid reservoir 202 and the first and second receptacles 204, 206. The heating element 212 is configured and adapted to heat a fluid to a desired temperature. Main fluid channel 211 is directed through a single heating channel 216 of a heating element 212 upstream from the diverter valve 213. Water is pumped from a water reservoir 202 to at least one of the receptacles 204 and 206 via a single pump 214, which is heated by the single-channel 216 heating element 212 and distributed via a diverter valve 213 into first and second channels 208 and 210 and then into first and second receptacles 204 and 206, respectively. Similar to the embodiment of FIG. 1A, receptacles 204 and 206 are fluidically separate from one another and are configured and adapted to receive separate ingredients or ingredient containers. The ingredient containers can be beverage pods 220 and 222, e.g. a coffee capsule, coffee filters, or the like.

With continued reference to FIG. 2, the mechanism 201 includes a purge assembly 124 positioned between the fluid reservoir 202 and the heating element 212. Purge assembly 124 includes a check-valve 126 and an air pump 128, similar to purge assembly 124. The air pump 128 is used to purge remaining water in main line 211, the first and second channels 208 and 210, and receptacles 204 and 206. In the embodiment of FIG. 2, two flow paths (first and second channels 208) are shown. It is contemplated, however, that there can be more than two flow paths and receptacles as desired in a given application. Mechanism 201 includes a temperature sensor 230 and at least one PCB 232 configured and adapted to monitor the temperature of the water as it is heated. Once the brew cycle is complete, the air pump 128 will purge the lines 208, 210 and 211 of remaining water and dry the pod(s) 220 and 222. If brewing one pod 220, or multiple pods 220 and 222 in succession, the diverter valve 213 will allow flow to only one pod at a time (for both brewing and purging).

Figure 3A:
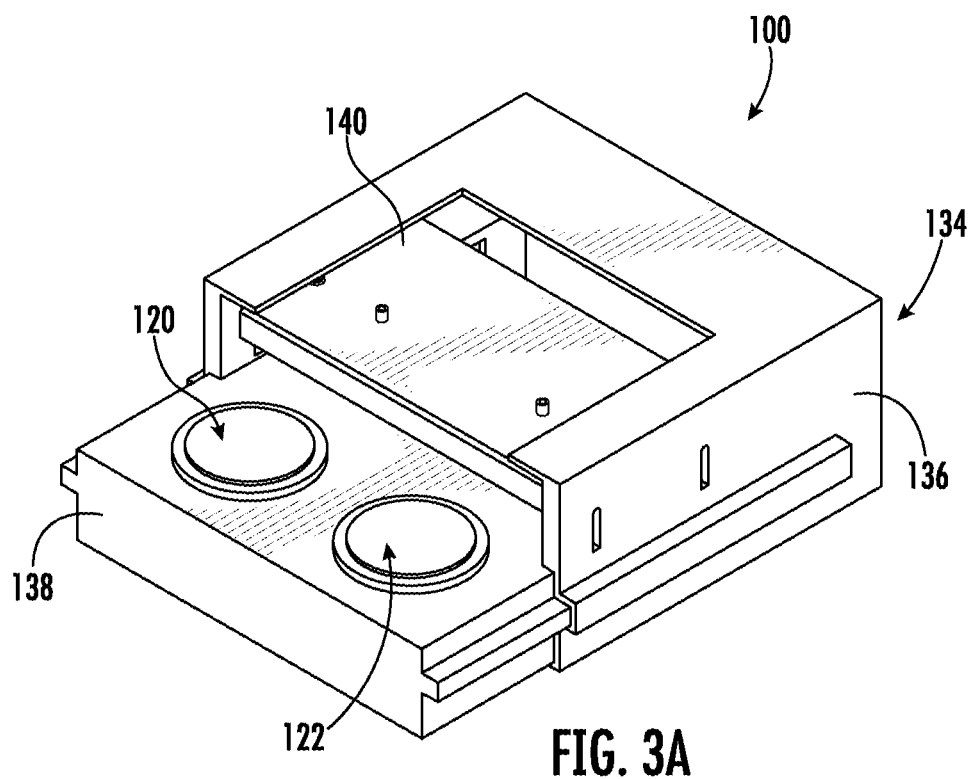
FIG. 3A is a perspective view of a portion of the mechanism of FIG. 1, showing a front-loading drawer assembly for housing adjacent beverage pods.

As shown in FIGS. 1A-1B and 3A, mechanism 101 for a brewing machine 100 includes a front-loading drawer assembly 134, housing adjacent beverage pods 120 and 122. The drawer assembly 134 includes a drawer housing 136 and a drawer 138. When drawer 138 is pushed inward, the head assembly 140 (containing the needles 142 and seals 144) moves downward with spring assistance, piercing the foils of beverage pods 120 and 122 and sealing the brew chambers 146 and 148. Flow paths/lines 150 are defined through respective needles 142. Fluid paths/lines 150 are in fluid communication with first and second channels 108 and 110 to provide water to respective brew chambers 146 and 148. Mechanism 201 includes a drawer assembly 234, which is the same as drawer assembly 134.

Figure 3B:
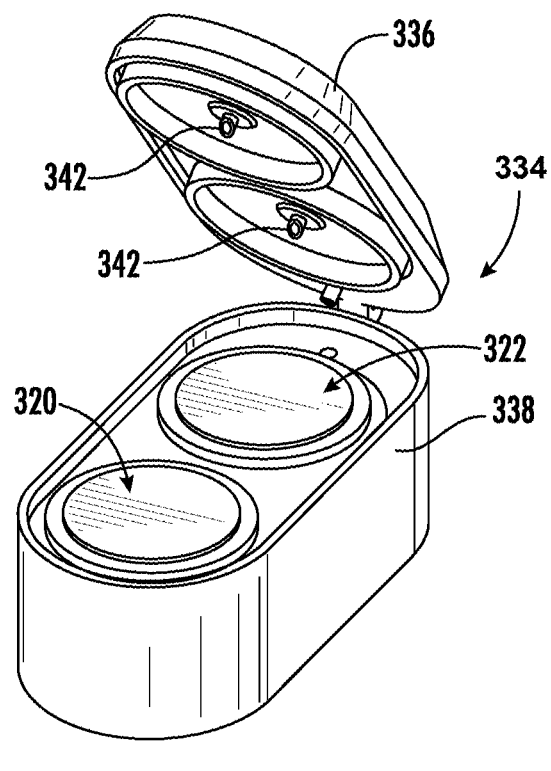
FIG. 3B is a perspective view of another embodiment of a capsule housing assembly constructed in accordance with the present disclose, showing the housing assembly with a removable basket and a rotatable lid.

As shown in FIG. 3B, another embodiment of a housing assembly 334 for beverage pods 320 and 322 utilizing a top-loading configuration is shown. Housing assembly 334 includes a removable basket 338 having a rotatable lid 336. Housing assembly 334 can be used in mechanism 101 or 201. The beverage pods 320 and 322 are adjacent to one another in a removable basket 338. As the lid 336 is rotated downward and depressed, needles 342 puncture the beverage pod foils and seal the brewing chambers. Each assembly 134 and 334 contain the beverage pods and associated components (needles, seals, and flowlines). Those skilled in the art will readily appreciate that housing assemblies 134 and 334 are two embodiments of possible housing designs, showing two beverage pods, and can be modified to accommodate any number of beverage pods.

The embodiments described above in FIGS. 1A-3B allows the brewing of multiple servings of beverage into one or multiple containers in the same amount of time it takes conventional beverage pod machines to brew a single serving. Embodiments also allow for brewing combinations that are not available with pod systems today: brewing multiple pods into a large container at one time (in contrast to brewing and replacing with another beverage pod before brewing again) by independently brewing each pod and then combining multiple pods of varying flavors and strengths into a single large container, or brewing separately into separate containers. Finally, the embodiments of the present disclosure permit the multi-serving brewing while still maintaining the capability to brew a single beverage, or multiple in succession without opening the device to replenish pods/ ingredients/grounds.

A method for brewing a beverage with a brewing machine, e.g., brewing machines 100 or 200, includes supplying a fluid from a fluid reservoir, e.g., fluid reservoir 102 or 202, to at least one of a first receptacle, e.g., first receptacle 104 or 204, downstream from the fluid reservoir, or a second receptacle, e.g., second receptacle 106 or 206, downstream from the fluid reservoir. The method includes heating the fluid from the fluid reservoir to a desired temperature with a heating element, e.g., heating element 112, or 212, located between the fluid reservoir and the first and second receptacles. The method includes flushing fluid back to the fluid reservoir with a purge assembly, e.g., purge assembly 124, positioned between the fluid reservoir and the heating element.

In some embodiments, e.g., that of FIGS. 1A and 1B, supplying the fluid includes supplying the fluid to the first receptacle via a first channel, e.g., first channel 108, that extends from the fluid reservoir to the first receptacle, and/or supplying the fluid to the second receptacle via a second channel, e.g., second channel 110, that extends from the fluid reservoir to the second receptacle. In some embodiments, heating the fluid includes heating the fluid with a first heating channel, e.g., first heating channel 116. The first channel is configured and adapted to flow through the first heating channel. Heating the fluid includes heating the fluid with a second heating channel, e.g., second heating channel 118. The second channel is configured and adapted to flow through the second heating channel.

In some embodiments, e.g., that of FIG. 2, supplying the fluid includes supplying the fluid to a main fluid channel, e.g., main fluid channel 211, upstream from the first and second receptacles, and then to at least one of a first channel, e.g., first channel 208, upstream from the first receptacle or a second channel, e.g., second channel 210, upstream from the second receptacle. The method includes dividing fluid flow from the main fluid channel to at least one of the first channel or second channel using a diverter valve, e.g., diverter valve 213, positioned between the main fluid channel and the first and second channels. Heating the fluid can include heating the fluid with a single heating channel, e.g., single heating channel 216, upstream from the diverter valve. The method can include flushing fluid back to the fluid reservoir with a purge assembly positioned between the fluid reservoir and the heating element.

The methods and systems of the present disclosure, as described above and shown in the drawings, provide for a beverage maker that effectively allows for producing multiple servings of beverages to be brewed simultaneously or in succession into multiple separate containers or into a single, larger container. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A mechanism for a brewing machine, the mechanism comprising:
a fluid reservoir;
a first receptacle downstream from the fluid reservoir;
a second receptacle downstream from the fluid reservoir;
a first channel configured and adapted to provide a fluid from the fluid reservoir to the first receptacle;
a second channel configured and adapted to provide a fluid from the fluid reservoir to the second receptacle;
a first pump coupled to the first channel for independently controlling fluid flow through the first channel;
a second pump operatively coupled to the second channel for independently controlling fluid flow through the second channel;
a first heating element located in the first channel and configured to heat fluid flowing through the first channel; and
a second heating element located in the second channel and configured to heat fluid flowing through the second channel.

2. The mechanism of claim 1, further comprising a main fluid channel upstream from the first and second channels for providing fluid from the fluid reservoir to the first and second channels.

3. The mechanism of claim 2, a diverter valve between the main fluid channel the first and second channels for dividing fluid flow from the main fluid channel to the first and second channels.

4. The mechanism of claim 3, further comprising a heating element located between the fluid reservoir and the first and second receptacles, the heating element configured and adapted to heat a fluid to a desired temperature, wherein the heating element includes a single channel, wherein the main fluid channel is directed through the single heating channel upstream from the diverter valve.

5. The mechanism of claim 1, wherein the first channel extends from the fluid reservoir to the first receptacle and the second channel extends from the fluid reservoir to the second receptacle.

6. The mechanism of claim 5, further comprising a heating element located between the fluid reservoir and the first and second receptacles, the heating element configured and adapted to heat a fluid to a desired temperature, wherein the heating element includes first and second heating channels, wherein the first channel is directed through the first heating channel, and wherein the second channel is directed through the second heating channel.

7. The mechanism of claim 5, further comprising two heating elements, each heating element located between the fluid reservoir and a respective one of the first and second receptacles, each heating element configured and adapted to heat a fluid to a desired temperature, wherein each heating element includes a respective heating channel, wherein the first channel is directed through the heating channel of a first of the two heating elements, and wherein the second channel is directed through the heating channel of a second of the two heating elements.

8. The mechanism of claim 1, wherein the first receptacle is configured and adapted to receive an ingredient container.

9. The mechanism of claim 8, wherein the ingredient container is a coffee capsule.

10. The mechanism of claim 1, wherein the second receptacle is configured and adapted to receive an ingredient container.

11. The mechanism of claim 10, wherein the ingredient container is a coffee capsule.

12. The mechanism of claim 1, wherein the first and second receptacles are each configured and adapted to receive an ingredient.

13. The mechanism of claim 1, further comprising a heating element located between the fluid reservoir and the first and second receptacles, the heating element configured and adapted to heat a fluid to a desired temperature.

14. A mechanism for a brewing machine, the mechanism comprising:
a fluid reservoir;
a first receptacle downstream from the fluid reservoir;
a second receptacle downstream from the fluid reservoir;
a first channel configured and adapted to provide a fluid from the fluid reservoir to the first receptacle;
a second channel configured and adapted to provide a fluid from the fluid reservoir to the second receptacle; and
a purge assembly positioned between the fluid reservoir and the first and second receptacles, the purge assembly including a check-valve and an air pump, and configured and adapted for flushing fluid back to the fluid reservoir.

* * * * *